US011039043B1

United States Patent
Zhang et al.

(10) Patent No.: US 11,039,043 B1
(45) Date of Patent: Jun. 15, 2021

(54) GENERATING SYNCHRONIZED SOUND FROM VIDEOS

(71) Applicant: International Business Machines Corporation, Armonk, NY (US)

(72) Inventors: Yang Zhang, Cambridge, MA (US); Chuang Gan, Cambridge, MA (US); Dakuo Wang, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/744,471

(22) Filed: Jan. 16, 2020

(51) Int. Cl.
*H04N 5/04* (2006.01)
*G06N 3/08* (2006.01)
*G10L 25/57* (2013.01)

(52) U.S. Cl.
CPC .............. *H04N 5/04* (2013.01); *G06N 3/08* (2013.01); *G10L 25/57* (2013.01)

(58) Field of Classification Search
CPC ............ H04N 5/04; G06N 3/08; G10L 25/57
USPC ....................................................... 348/515
See application file for complete search history.

(56) References Cited

U.S. PATENT DOCUMENTS

| | | | |
|---|---|---|---|
| 9,743,033 B2 * | 8/2017 | Kim | G11B 27/11 |
| 10,334,202 B1 * | 6/2019 | Zhou | G06N 3/0445 |
| 2013/0294746 A1 * | 11/2013 | Oz | H04N 5/76 386/241 |
| 2017/0061966 A1 | 3/2017 | Marcheret et al. | |
| 2017/0206892 A1 | 7/2017 | Doddipatla | |
| 2018/0068019 A1 * | 3/2018 | Novikoff | G06F 16/783 |
| 2018/0197533 A1 * | 7/2018 | Lyon | G10L 15/02 |
| 2019/0005128 A1 * | 1/2019 | Barari | H04N 21/439 |

(Continued)

FOREIGN PATENT DOCUMENTS

| CN | 109635676 A | 4/2019 |
|---|---|---|
| EP | 002234024 A1 | 9/2010 |

(Continued)

OTHER PUBLICATIONS

R. Arandjelovic and A. Zisserman. Look, listen and learn. In The IEEE International Conference on Computer Vision, pp. 609-617, 2017.

(Continued)

*Primary Examiner* — John W Miller
*Assistant Examiner* — Sean N. Haiem

(57) ABSTRACT

Embodiments herein describe an audio forwarding regularizer and an information bottleneck that are used when training a machine learning (ML) system. The audio forwarding regularizer receives audio training data and identifies visually irrelevant and relevant sounds in the training data. By controlling the information bottleneck, the audio forwarding regularizer forwards data to a generator that is primarily related to the visually irrelevant sounds, while filtering out the visually relevant sounds. The generator also receives data regarding visual objects from a visual encoder derived from visual training data. Thus, when being trained, the generator receives data regarding the visual objects and data regarding the visually irrelevant sounds (but little to no data regarding the visually relevant sounds). Thus, during an execution stage, the generator can generate sounds that are relevant to the visual objects while not adding visually irrelevant sounds to the videos.

20 Claims, 6 Drawing Sheets

(56) References Cited

U.S. PATENT DOCUMENTS

| | | | |
|---|---|---|---|
| 2019/0005976 A1* | 1/2019 | Peleg | G06K 9/00228 |
| 2019/0035431 A1* | 1/2019 | Attorre | G10L 17/00 |
| 2019/0122411 A1* | 4/2019 | Sachs | G06T 19/20 |
| 2019/0236416 A1* | 8/2019 | Wang | G06K 7/1417 |

FOREIGN PATENT DOCUMENTS

| | | | |
|---|---|---|---|
| WO | 2004040576 A1 | 5/2004 | |
| WO | 2019097412 A1 | 5/2019 | |
| WO | 2019104229 A1 | 5/2019 | |

OTHER PUBLICATIONS

M. Arjovsky, S. Chintala, and L. Bottou. Wasserstein generative adversarial networks. In Proceedings of the International Conference on Machine Learning, pp. 214-223, 2017.

Y. Aytar, C. Vondrick, and A. Torralba. Soundnet: Learning sound representations from unlabeled video. In Advances in Neural Information Processing Systems, pp. 892-900, 2016.

K. Chen, C. Zhang, C. Fang, Z. Wang, T. Bui, and R. Nevatia. Visually indicated sound generation by perceptually optimized classification. In The European Conference on Computer Vision, pp. 560-574, 2018.

L. Chen, S. Srivastava, Z. Duan, and C. Xu. Deep cross-modal audio-visual generation. In Proceedings of the on Thematic Workshops of ACM Multimedia, pp. 349-357, 2017.

C. Donahue, J. McAuley, and M. Puckette. Adversarial audio synthesis. In International Conference on Learning Representations, 2019.

J. Engel, K. K. Agrawal, S. Chen, I. Gulrajani, C. Donahue, and A. Roberts. GANSynth: Adversarial neural audio synthesis. In International Conference on Learning Representations, 2019.

J. F. Gemmeke, D. P. Ellis, D. Freedman, A. Jansen, W. Lawrence, R. C. Moore, M. Plakal, and M. Ritter. Audio set: An ontology and human-labeled dataset for audio events. In The IEEE International Conference on Acoustics, Speech and Signal Processing, pp. 776-780, 2017.

I. J. Goodfellow, J. Pouget-Abadie, M. Mirza, B. Xu, D. Warde-Farley, S. Ozair, A. C. Courville, and Y. Bengio. Generative adversarial nets. In Advances in Neural Information Processing Systems, pp. 2672-2680, 2014.

D. F. Harwath, A. Torralba, and J. R. Glass. Unsupervised learning of spoken language with visual context. In Advances in Neural Information Processing Systems, pp. 1858-1866, 2016.

S. Ioffe and C. Szegedy. Batch normalization: Accelerating deep network training by reducing internal covariate shift. In International Conference on Learning Representations, pp. 448-456, 2015.

P. Isola, J. Zhu, T. Zhou, and A. A. Efros. Image-to-image translation with conditional adversarial networks. In The IEEE Conference on Computer Vision and Pattern Recognition, pp. 5967-5976, 2017.

D. P. Kingma and J. Ba. Adam: A method for stochastic optimization. In International Conference on Learning Representations, 2015.

Z. Ling, S. Kang, H. Zen, A. W. Senior, M. Schuster, X. Qian, H. M. Meng, and L. Deng. Deep learning for acoustic modeling in parametric speech generation: A systematic review of existing techniques and future trends. IEEE Signal Processing Magazine, 32(3):35-52, 2015. [Abstract Only].

S. Mehri, K. Kumar, I. Gulrajani, R. Kumar, S. Jain, J. Sotelo, A. C. Courville, and Y. Bengio. Samplernn: An unconditional end-to-end neural audio generation model. In International Conference on Learning Representations, 2017.

M. Mirza and S. Osindero. Conditional generative adversarial nets. arXiv preprint arXiv:1411.1784, 2014.

A. Owens, P. Isola, J. McDermott, A. Torralba, E. H. Adelson, and W. T. Freeman. Visually indicated sounds. In Proceedings of the IEEE conference on computer vision and pattern recognition, pp. 2405-2413, 2016.

A. Owens, J. Wu, J. H. McDermott, W. T. Freeman, and A. Torralba. Ambient sound provides supervision for visual learning. In The European Conference on Computer Vision, pp. 801-816, 2016.

A. Radford, L. Metz, and S. Chintala. Unsupervised representation learning with deep convolutional generative adversarial networks. In International Conference on Learning Representations, 2016.

S. E. Reed, Z. Akata, X. Yan, L. Logeswaran, B. Schiele, and H. Lee. Generative adversarial text to image synthesis. In Proceedings of the International Conference on Machine Learning, pp. 1060-1069, 2016.

J. Shen, R. Pang, R. J. Weiss, M. Schuster, N. Jaitly, Z. Yang, Z. Chen, Y. Zhang, Y. Wang, R. Skerrv-Ryan, et al. Natural tts synthesis by conditioning wavenet on mel spectrogram predictions. In IEEE International Conference on Acoustics, Speech and Signal Processing, pp. 4779-4783, 2018.

J. Sotelo, S. Mehri, K. Kumar, J. F. Santos, K. Kastner, A. C. Courville, and Y. Bengio. Char2wav:End-to-end speech synthesis. In International Conference on Learning Representations, 2017.

K. van den Doel, P. G. Kry, and D. K. Pai. Foleyautomatic: physically-based sound effects for interactive simulation and animation. In Proceedings of the Annual Conference on Computer Graphics and Techniques, pp. 537-544, 2001. [Abstract Only].

A. van den Oord, S. Dieleman, H. Zen, K. Simonyan, O. Vinyals, A. Graves, N. Kalchbrenner, A. W. Senior, and K. Kavukcuoglu. Wavenet: A generative model for raw audio. In ISCA Speech Synthesis Workshop, p. 125, 2016.

Y. Zhou, Z. Wang, C. Fang, T. Bui, and T. L. Berg. Visual to sound: Generating natural sound for videos in the wild. In The IEEE Conference on Computer Vision and Pattern Recognition, pp. 3550-3558, 2018.

PCT Notification of Transmittal of the International Search Report and the Written Opinion of the International Searching Authority, or the Declaration for Application No. PCT/IB2021/050167 dated Apr. 15, 2021.

\* cited by examiner

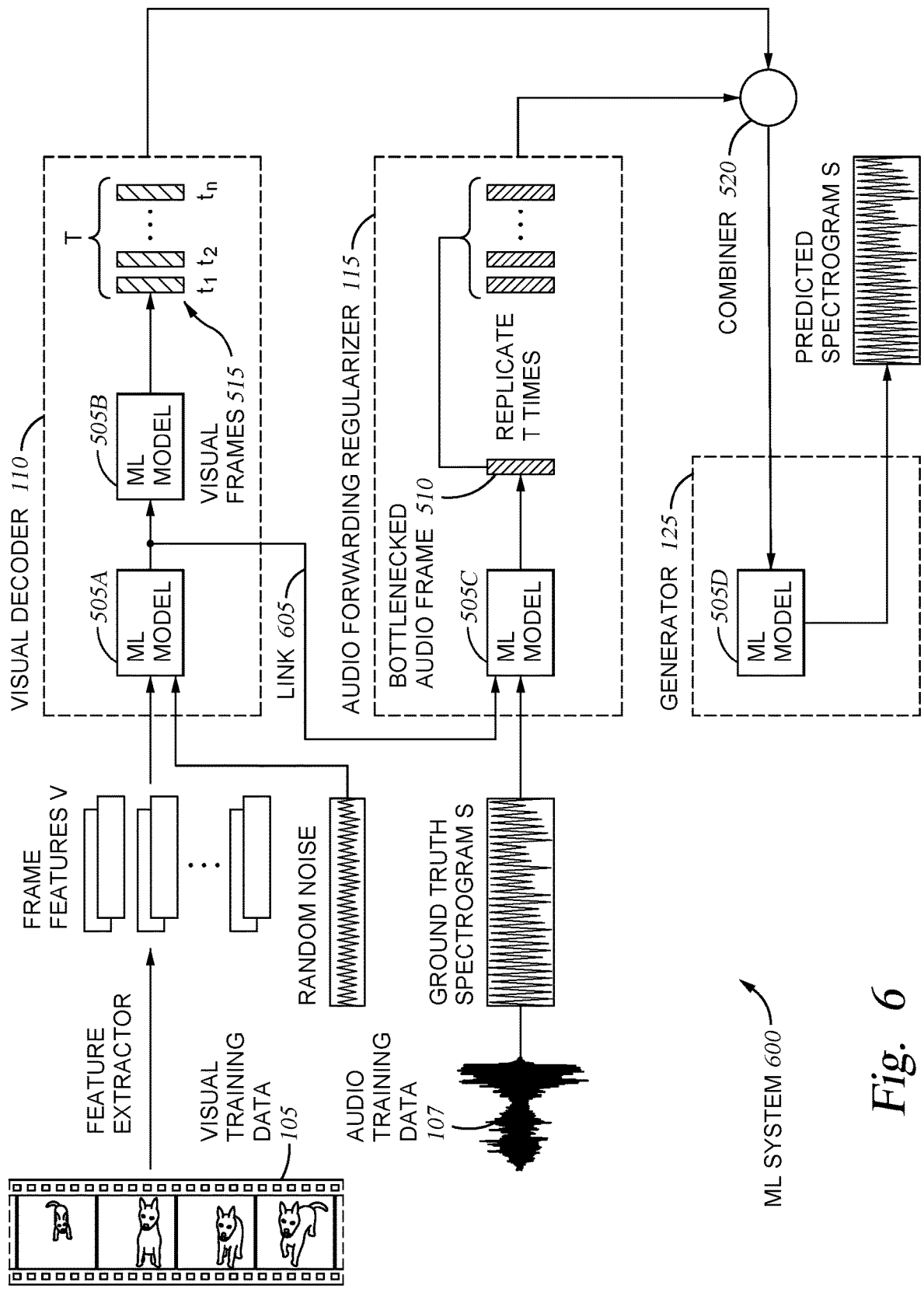

GENERATING SYNCHRONIZED SOUND FROM VIDEOS

BACKGROUND

The present invention relates to identifying visually relevant versus visually irrelevant sounds from training data, and more specifically, to training a sound generating system using visually irrelevant sounds.

Various visual events in daily life are usually accompanied with different sounds. In many cases, visual events and sounds are so closely correlated that one can instinctively infer what the sounds would be by observing the visual events. While the correlation between visual events and sounds is instinctive to humans, it is a difficult task for machine learning applications. That is, using machine learning applications to derive sound from silent videos (i.e., visual data without synchronized audio) is difficult but there are many real-world applications, such as video editing automation, generating sound for silent films, and assisting people with visual impairment.

One reason that deriving sounds for visual data is difficult is because training data used to train machine learning (ML) systems often has audio data that is irrelevant to the visual data (referred to as visually irrelevant sounds). For example, the visual training data may show a dog barking while the audio training data includes both a dog bark as well as applause from a crowd that is not shown in the visual training sounds (e.g., a visually irrelevant sound). That is, the audio training data includes both visually relevant data (e.g., the sound of a dog barking) and visually irrelevant sounds. Training the ML systems using audio training data that includes visually irrelevant sounds can confuse the ML systems into correlating the visually irrelevant sounds with the objects in the visual training data, even though they are unrelated. However, finding training data that does not have any visually irrelevant sounds is difficult. Thus, there is a need to train a ML system using training data that may include both visually relevant and irrelevant sounds.

SUMMARY

One embodiment of the present invention is a method that includes receiving visual training data at a visual encoder comprising a first ML model, identifying, using the first ML model, data corresponding to a visual object in the visual training data, and receiving audio training data synchronized to the visual training data at an audio forwarding regularizer comprising a second ML model where the audio training data comprises a visually relevant sound and a visually irrelevant sound that are both synchronized to a same frame in the visual training data that includes the visual object and where the visually relevant sound corresponds to the visual object but the visually irrelevant sound is generated by an audio source that is not visible in the same frame. The method also includes filtering data corresponding to the visually relevant sound from an output of the second ML model using an information bottleneck, and training a third ML model downstream from the first and second ML models using the data corresponding to the visual object and data corresponding to the visually irrelevant sound. One advantage of this embodiment relative to previous solutions is that the third ML model can account for visually irrelevant sounds when being trained. Thus, the third ML model can accurately be trained with training data that includes both visually relevant and irrelevant sounds.

Another embodiment of the present invention includes the embodiment above and may further include, after training the third ML model, performing an execution stage that includes receiving a silent video at the first ML model, identifying, using the first ML model, data corresponding to a second visual object in the silent video, generating, using the third ML model, a visually relevant sound to synchronize to at least one video frame of the silent video containing the second visual object where data corresponding to the second visual object is inputted to the third ML model, and generating a media presentation based on the synchronized visually relevant sound and video frames in the silent video. One advantage of this embodiment relative to previous solutions is that the likelihood that the third ML model selects a visually irrelevant sound to synchronize with the video frames of the silent video is greatly reduced.

Another embodiment of the present invention includes the embodiments above and when performing the execution state, the second ML model in the audio forwarding regularizer may be unused. Advantageously, not using the second ML model during the execution stage may improve the performance of the ML system since these components may are used during training but not during execution.

In any of the embodiments above, the information bottleneck may be implemented by limiting a dimension of an output of the second ML model, where limiting the dimension prevents data corresponding to the visually relevant sound from reaching the third ML model.

In any of the embodiments above, the second ML model can be implemented using a sequence-to-sequence ML model. Advantageously, a sequence-to-sequence ML model provides improved results compared to other ML models when processing time dependent information such as the audio and visual training data.

In the embodiment above, the sequence-to-sequence ML model can optionally output a bottlenecked audio frame based on the audio training data and the information bottleneck. Further, the method can optionally include replicating the bottlenecked audio frame according to a number of T time periods in the visual training data and transmitting the replicated bottlenecked audio frames to the third ML model. Advantageously, there are as many copies of the bottlenecked audio frame as the visual frames which can improve the ability of the third ML model to distinguish between the visual objects identified by the first ML model and the visually irrelevant sounds identified by the second ML model.

BRIEF DESCRIPTION OF THE SEVERAL VIEWS OF THE DRAWINGS

FIG. 6 is a system for training machine learning models to synchronize sounds to visual data, according to one embodiment described herein.

DETAILED DESCRIPTION

Embodiments herein describe machine learning (ML) systems for deriving sounds that can be synchronized to visual data. One advantage of the present embodiments is that the ML systems can account for visually irrelevant sounds when training the ML systems. This means the ML systems can be trained with audio data that includes irrelevant sounds which vastly increases the number and diversity of media presentations that can be used to train the ML systems.

In one embodiment, the ML system includes an audio forwarding regularizer and an information bottleneck that are used when training the ML system. The audio forwarding regularizer (or just "regularizer") includes a ML model that receives audio training data and identifies visually irrelevant and relevant sounds in the training data. By controlling the information bottleneck, the ML system causes the audio forwarding regularizer to forward data to a generator that is primarily related to the visually irrelevant sounds, while the visually relevant sounds are filtered out. In parallel, the generator also receives data regarding visual objects from a visual encoder derived from visual training data. As such, when being trained, the generator receives data regarding the visual objects in the training media presentation from the visual encoder and data regarding the visually irrelevant sounds from the audio forwarding regularizer (but little to no data regarding the visually relevant sounds). As a result, the generator learns to distinguish between the visual objects (i.e., the objects in the visual training data) and the visually irrelevant sounds (i.e., sounds that are irrelevant to the visual objects). Thus, when executing the ML system to derive sounds for silent videos, the generator can generate sounds that are relevant to the visual objects (e.g., visually relevant sounds) while not adding or synchronizing visually irrelevant sounds to the videos.

Figure 1:
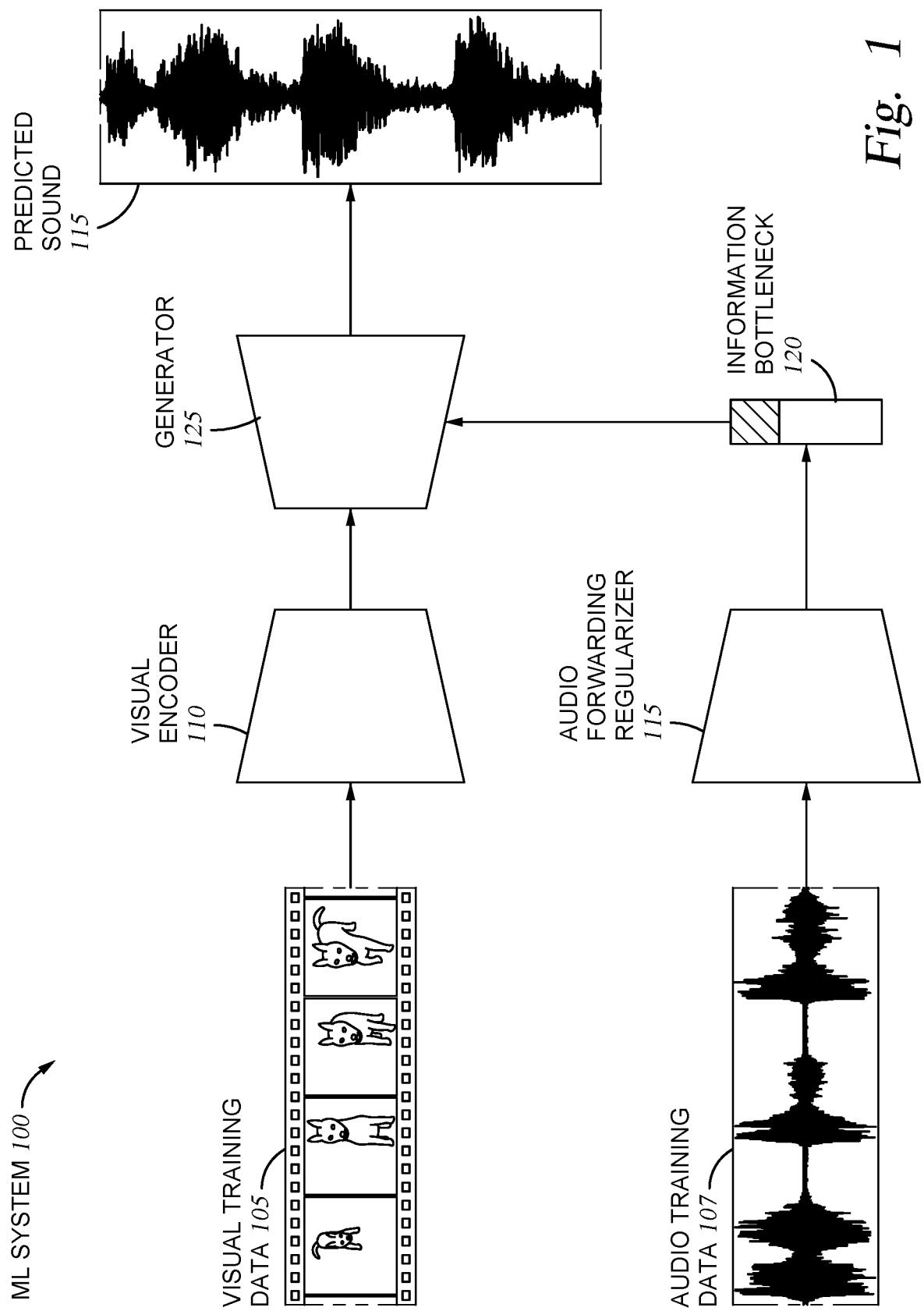
FIG. 1 is a system for training machine learning models to synchronize sounds to visual data, according to one embodiment described herein.

FIG. 1 is a ML system 100 for training ML models to synchronize sounds to visual data, according to one embodiment described herein. The ML system 100 includes a visual encoder 110, an audio forwarding regularizer 115, and a generator 125, which each include one or more ML models. The details of these ML models are described in later figures.

As shown, the visual encoder 110 receives visual training data 105 as an input. In one embodiment, the visual training data 105 includes a plurality of sequential video frames. In contrast, the audio forwarding regularizer 115 receives audio training data 107, which includes sounds synchronized to the visual training data 105. For example, the visual training data 105 may be the visual information from a training media presentation while the audio training data 107 contains the sounds of the training media presentation. However, as discussed above, the audio training data 107 can include both visually relevant sounds (i.e., sounds that are correlated to the visual objects in the visual training data 105) as well as visually irrelevant sounds (i.e., sounds that are uncorrelated or unrelated to the synchronized visual objects in the visual training data 105). In one embodiment, the audio sources of the visually relevant sounds are off-screen—i.e., not visible in the corresponding video frames. Using the techniques herein, the ML system 100 can be trained so that the generator 125 can distinguish between the visually relevant and irrelevant sounds so that during execution when only receiving a silent video (e.g., visual data that is not synchronized to any sound), the generator 125 can generate or derive visually relevant sounds which can then be synchronized to the silent video to generate a media presentation that includes audio synchronized to the visual data.

In general, the goal of the visual encoder 110 is to identify the visual objects in the visual training data 105 such as a dog, person, car, etc. The visual encoder 110 can also use its ML model (or models) to identify the actions being performed by the visual objects such as a dog that is barking, a person bouncing a basketball, or a car slamming on its brakes. These visual objects and their actions can then be transmitted to the generator 125.

The audio forwarding regularizer 115 uses its ML model (or models) to identify the visually relevant and irrelevant sounds in the audio training data 107. For example, the visually relevant sounds may include the sounds generated by the visual objects in the visual training data 105, such as the bark from a dog, the sound of a basketball bouncing, or the scream from the tires causes by a car slamming on its brakes. The audio training data 107 also includes visually irrelevant sounds that is unrelated or independent from the visual objects in the data 105 or their actions. Examples of visually irrelevant sounds could be the applause of an audience (when the audience is not shown in the visual training data 105), narration of a commenter regarding a basketball game, or sounds made by animals that are currently off-screen (e.g., are not within the synchronized frames in the visual training data 105). For example, at one point of time a sound in the audio training data 107 may be a visually relevant sound when the source of that sound is currently visible in the synchronized frames of the visual training data 105 but may latter be a visually irrelevant sound if its source is no longer viewable in the synchronized frames of the visual training data 105.

The goal of the generator 125 is to reproduce the audio training data 107 (which includes both the visual relevant and irrelevant sounds) using the inputs provided by the visual encoder 110 and the audio forwarding regularizer 115. However, simply sending data regarding the visual relevant and irrelevant sounds to the generator 125 during training can result in the generator 125 correlating both the visual relevant and irrelevant sounds to the visual objects identified by the visual encoder 110 which leads to generator 125 to add both visual relevant and irrelevant sounds to silent videos during an execution stage (i.e., after training is complete). To prevent this, the ML system 100 includes an information bottleneck 120 that limits the amount of data regarding the visually relevant sounds that is transmitted to the generator 125 and instead focuses on transmitting the visually irrelevant sounds to the generator 125.

Though it may appear counter intuitive to send data regarding visually irrelevant sounds to the generator 125 during training (since visually irrelevant sounds should be ignored during the execution stage), doing so advantageously results in improved results where the generator 125 is able to distinguish between the visual objects and the visually irrelevant sounds during training rather than mistakenly correlating them. For example, if the information bottleneck 120 is too wide, then a significant amount of the data regarding the visually relevant sounds as well as the visually irrelevant sounds is provided to the generator 125. In that scenario, the generator 125 is able to "cheat" and use the input received from the audio forwarding regularizer as the predicted sound 130. As a result, the generator 125 does not learn that the visually irrelevant sounds are not correlated to the visual data provided by the visual encoder 110.

However, as the information bottleneck 120 is tightened, the amount of data corresponding to the visually relevant sounds transmitted to the generator 125 is reduced. Thus, the generator 125 can no longer simply use the sounds it receives from the regularizer 115 as the predicted sound 130 (which should include both the visually relevant and irrelevant sounds). Thus to generate the visually relevant sounds for the predicted sound 130 (e.g., when attempting to reconstruct the audio training data 107), the ML model or models in the generator 125 are forced to determine that the data provided by the audio forwarding regularizer 115 does not include the visually relevant sounds and instead derive those sounds from the visual objects provided by the visual encoder 110. For example, the generator 125 may have access to a database to identify sounds that are related to the visual objects identified by the visual encoder 110. As a result of this process, the generator 125 learns that the data regarding the visual irrelevant sounds received from the audio forwarding regularizer 115 is in fact unrelated to the visual objects generated by the visual encoder 110, thus achieving the desired effect of training the generator 125 to recognize visually irrelevant sounds. For example, the generator 125 can determine that the applause of an unseen audience is unrelated to a visible barking dog, or that the commentator from an off-screen announcer is unrelated to an on-screen basketball player bouncing a ball.

During the training stage, the generator 125 has a goal of outputting a predicted sound 130 that includes both the visually relevant and irrelevant sounds. That is, the predicted sound 130 should be as close as possible to the sounds that are in the audio training data 107 (which serves as a ground truth). During that process, and as explained above, the ML model or models in the generator 125 learn to identify visually irrelevant sounds.

In one embodiment, the visual encoder 110, the audio forwarding regularizer 115, the information bottleneck 120, and the generator 125 are stored in memory as program code that is executed in a processor in at least one computing system. For example, the visual encoder 110, the audio forwarding regularizer 115, the information bottleneck 120, and the generator 125 may be implemented using a ML framework (e.g., a ML software application) that is stored in memory and executed by a processor in a computing system.

Figure 2:
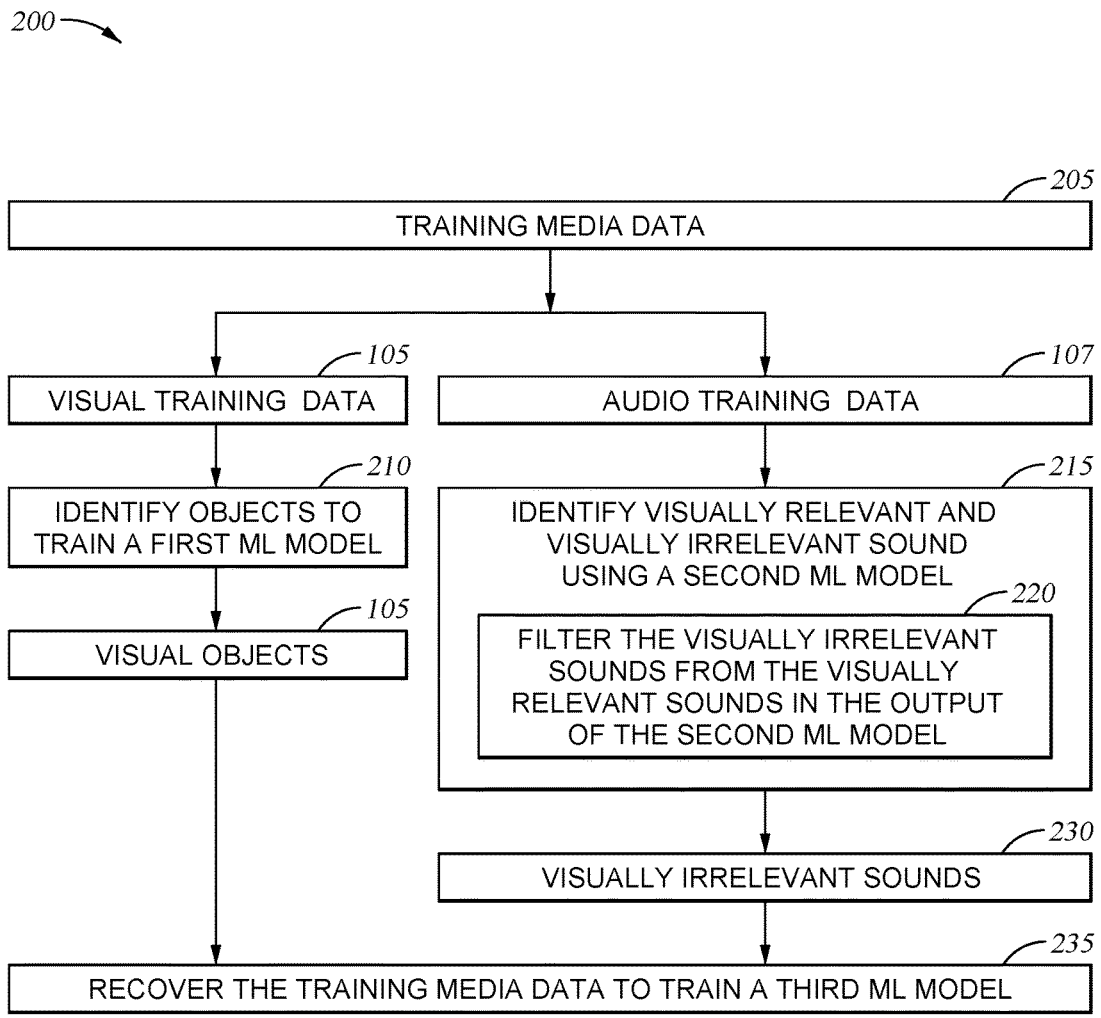
FIG. 2 is a flowchart for training machine learning models to synchronize sounds to visual data, according to one embodiment described herein.

FIG. 2 is a flowchart of a method 200 for training ML models to synchronize sounds to visual data, according to one embodiment described herein. In this embodiment, the ML system receives training media data 205 which includes both visual training data 105 (e.g., the video frames) as well as audio training data 107 (e.g., the synchronized sounds or soundtrack of the training media). That is, the training media data 205 can be separated such that its video data (e.g., the visual training data 105) is provided to a visual encoder while the corresponding audio data (e.g., the audio training data 107) is provided to the audio forwarding regularizer.

At block 210, the visual encoder identifies objects to train a first ML model. In one embodiment, the visual encoder identifies visual objects in the visual training data 105. In addition to identifying visual objects 225, the visual encoder can also identify the actions currently being performed by the visual objects 225 or some other metadata associated with the object such as the type of object (e.g., the age of the person, or breed of dog). The visual encoder can include any type of ML model suitable for identifying the visual objects 225.

At block 215, the audio forwarding regularizer identifies visually relevant and irrelevant sounds using a second ML model. That is, the second ML model in the regularizer identifies the various sounds in the audio training data 107. As part of this process, at block 220 the information bottleneck filters the visually irrelevant sounds from the visually relevant sounds represented in the output of the second ML model. Rather than permitting the second ML model to output all of its generated output data, the information bottleneck limits the output of the second ML model such that the data regarding the visually irrelevant sounds 230 is primarily transmitted to the generator while most (or all) of the data regarding the visually relevant sounds is filtered out (i.e., is not forwarded to the generator). The audio forwarding regularizer can include any type of ML model suitable for identifying the visually irrelevant sounds 230.

At block 235, the generator recovers the training media to train a third ML model. As part of training the third ML model, the generator attempts to generate (or recover or reproduce) the audio training data 107 that was received by the regularizer. As explained above, the generator receives the visually irrelevant sounds from the audio forwarding regularizer, but not the visually relevant sounds. Thus, the third ML model attempts to recover the visually relevant sounds from the visual objects 225 in order to reproduce the audio training data 107 and the training media data 205. As part of this process, the third ML model learns that the visual objects 225 are distinct from the visually irrelevant sounds 230. Thus, during a later execution stage, the third ML model can avoid generating visually irrelevant sounds when generating sounds for a silent video.

Figure 3:
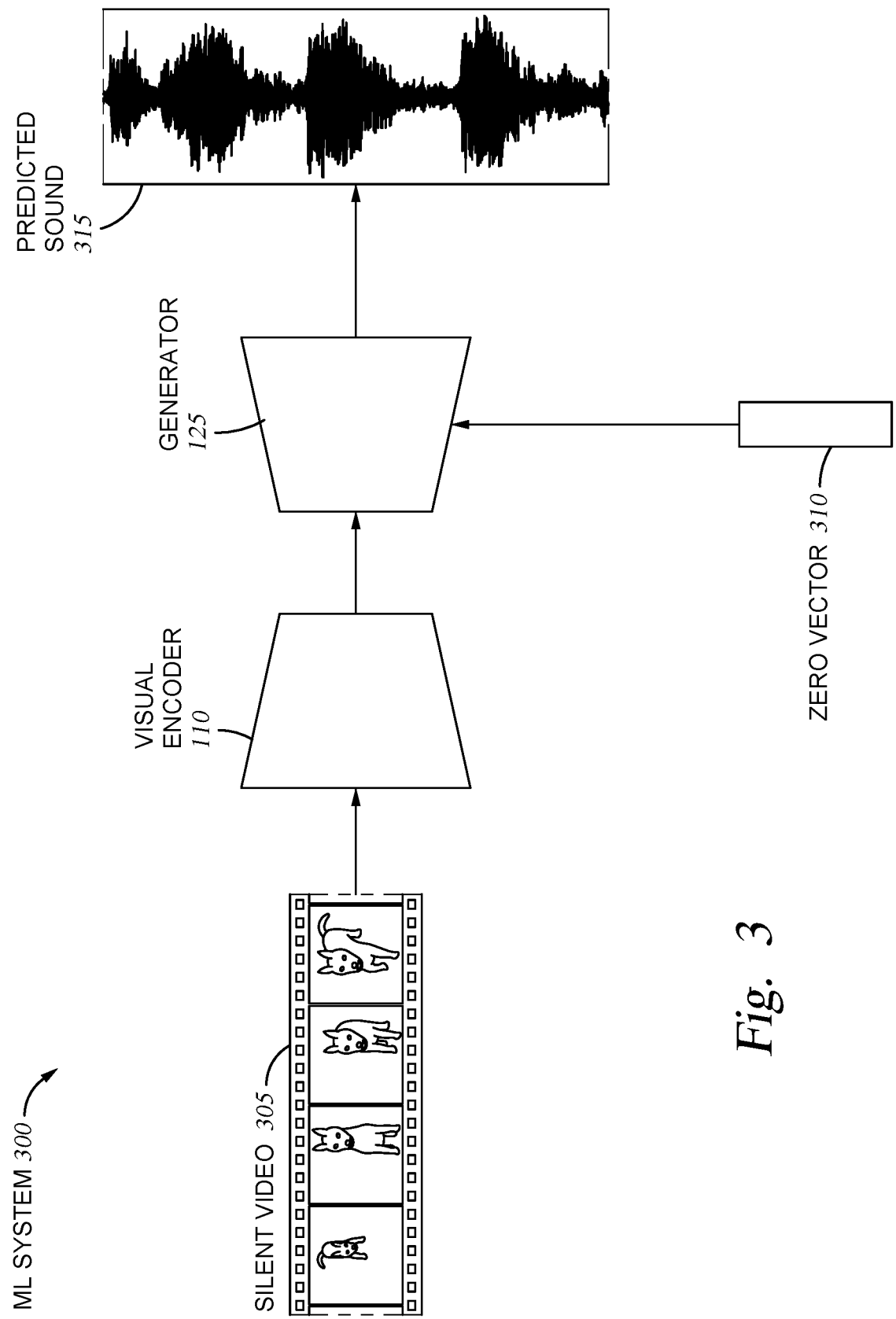
FIG. 3 is a system for synchronizing sounds to visual data using trained machine learning models, according to one embodiment described herein.

FIG. 3 is a ML system 300 for synchronizing sounds to visual data using trained ML models, according to one embodiment described herein. While FIG. 1 illustrates a ML system for training ML models, the ML system 300 is used during an execution stage to generate sounds for a silent video after the ML models have been trained (e.g., after the method 200 has been performed).

The ML system 300 includes the visual encoder 110 and the generator 125 as discussed above. However, the system 300 lacks the audio forwarding regularizer and the information bottleneck. Instead, the input of the generator 125 which was used during the training stage in FIG. 1 to receive the output of the regularizer and the information bottleneck instead receives a zero vector 310 (e.g., a vector with zeros). Thus, the regularizer and the information bottleneck are not used during the execution stage of the ML system 300, which advantageously improves the performance of the ML system since these components may only be used during training but not during execution. Instead, the generator 125 relies on its trained ML model to identify sounds for the visual objects identified by the visual encoder 110.

During the execution stage, the visual encoder 110 receives a silent video 305—e.g., a series of video frames where there is no corresponding or synchronized sound for the frames. In one embodiment, the goal of the ML system 300 during the execution stage is to generate sounds corresponding to the silent video 305. For example, if the silent video 305 depicts a barking dog or fireworks, the ML system 300 can use the trained ML models in the visual encoder 110 and the generator 125 to generate sounds that are visually relevant—e.g., a dog bark or booms and crackles for the fireworks.

Like in the training stage, the visual encoder 110 identifies the visual objects in the silent video 305. The visual encoder 110 can also identify the action of the visual objects or a type or characteristic of the visual objects. This information is then forwarded to the generator 125.

The generator 125 uses its trained ML model or models to identify synchronized sounds for the silent video 305. For example, if the visual object shows a barking dog, the generator 125 can determine to synchronize a barking sound with the video frames illustrating the barking dog. Because when training the ML model(s) in the generator 125, the model(s) were taught to distinguish between the visual objects and the visually irrelevant sounds in the training media data, during execution the generator 125 is less likely to add and synchronize a visually irrelevant sound to a visual object identified in the silent video 305, thereby resulting in an advantage relative to previous solutions that do not use the audio forwarding regularizer during the training stage. Put differently, the generator 125 is more likely to synchronize only visually relevant sounds to the visual objects and their actions depicted in the silent video 305. The generator 125 outputs a predicted sound 315 that includes visually relevant sounds synchronized to the frames of the silent video. The ML system 300 can generate a new media presentation that includes sounds synchronized to the video frames of the silent video 305.

Figure 4:
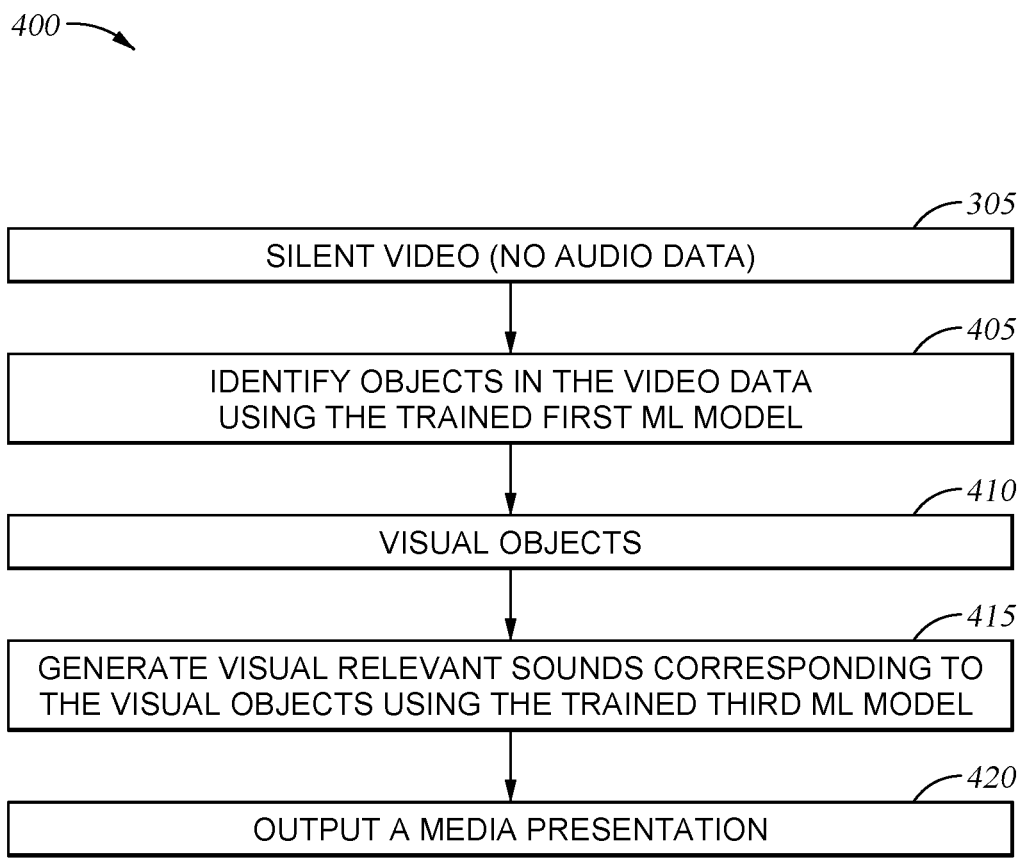
FIG. 4 is flowchart for synchronizing sounds to visual data, according to one embodiment described herein.

FIG. 4 is flowchart of a method 400 for synchronizing sounds to visual data, according to one embodiment described herein. The ML system receives a silent video 305 that may include a series of video frames where at least a portion of the video 305 (or all of the video 305) lacks corresponding audio data or sounds. The method 400 can be used to generate sounds synchronized to portion(s) of the video 305 that previously lacked audio data.

At block 405, the visual encoder identifies objects in the frames of the video data using the trained first ML model. The visual encoder may perform the same techniques as performed at block 210 of FIG. 2 to transmit data corresponding to visual objects 410 to the generator.

At block 415, the generator generates visually relevant sounds corresponding to the visual objects in the frames of the video data using the trained third ML model. That is, the generator uses the visual objects 410 to identify sounds related to these objects. These sounds are synchronized to the frames of the silent video 305.

At block 420, the ML system outputs a media presentation that includes the video frames of the silent video that have now been synchronized to the visually relevant sounds identified by the generator. Thus, when the media presentation is played, the user sees the visual objects 410 as well as synchronized sounds that relate to the visual objects 410. Advantageously, the embodiments discussed herein mitigate the chance that the generator will select a visually irrelevant sound to include in the media presentation.

Figure 5:
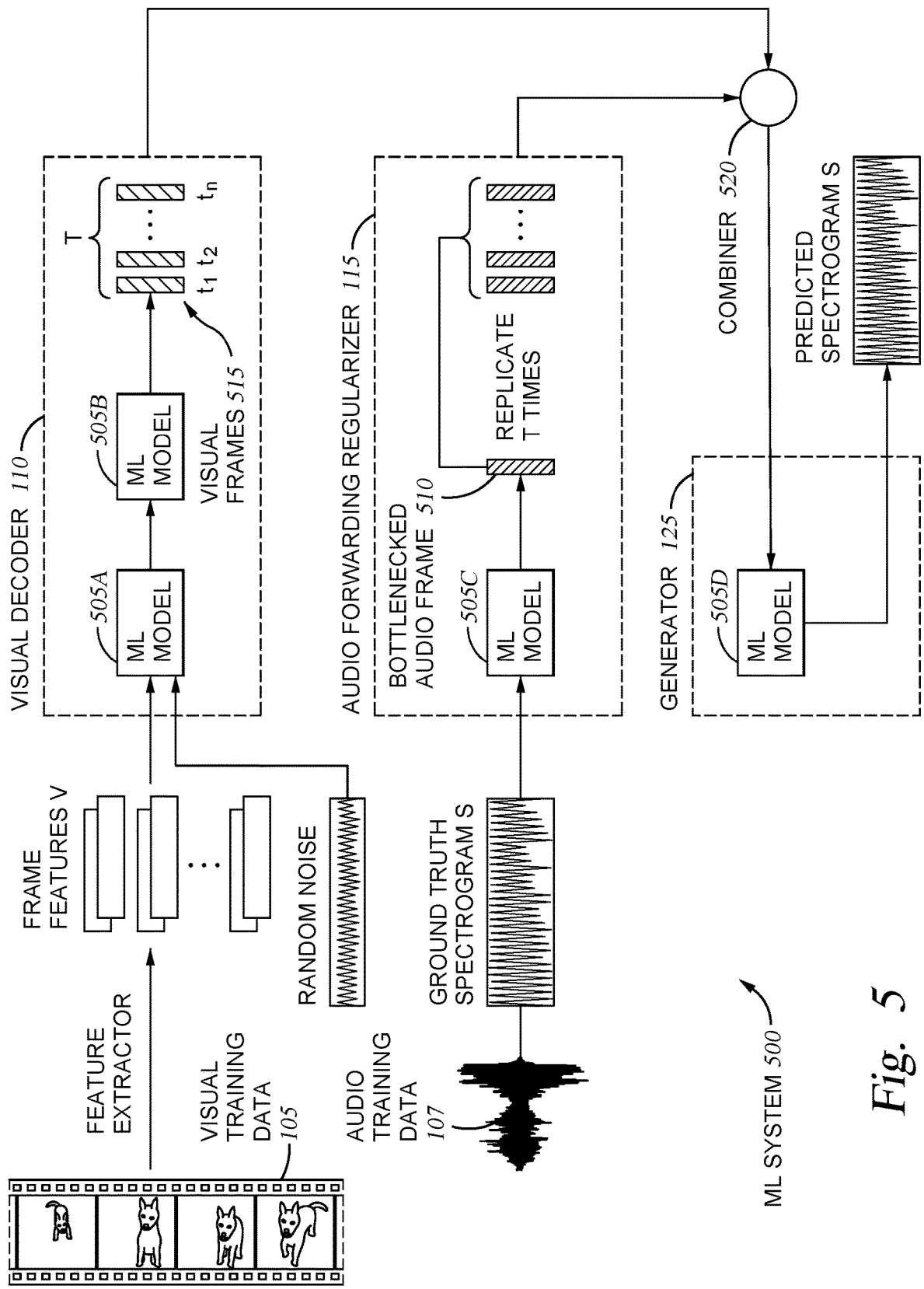
FIG. 5 is a system for training machine learning models to synchronize sounds to visual data, according to one embodiment described herein.

FIG. 5 is a ML system 500 for training ML models to synchronize sounds to visual data, according to one embodiment described herein. Generally, the ML system 500 is one embodiment of the ML system 100 illustrated in FIG. 1. Like the ML system 100, the ML system 500 includes a visual encoder 110, audio forwarding regularizer 115, and a generator 125 which each include at least one ML model that is trained using visual training data 105 and audio training data 107.

As shown, a feature extractor extracts frame features from the visual training data 105. These frame features are then used as inputs to a ML model 505A in the visual encoder 110. In one embodiment, the ML model 505A represents one or more convolution neural networks (CNN) that generates one or more vertical vectors. For example, if the visual training data 105 has 24 frames per second, each CNN may output 24 vertical vectors per second. However, in one embodiment, the output of the ML model 505A is a single vector per time (e.g., per second) which is then fed into a ML model 505B.

In one embodiment, the ML model 505B specializes in processing time dependent information, like the video frames in the visual training data. In one embodiment, the ML model 505A is a sequence-to-sequence ML model, which can be a long short-term memory (LSTM), a bi-directional LSTM, a recurrent neural network (RNN), a 1D convolutional neural network (convnet), or other sequence learning methods. In one embodiment, the ML model 505B outputs a vertical frames every second. Thus, assuming there are T seconds in the visual training data 105, the ML model 505B outputs T visual frames 515.

In FIG. 5, the audio training data 107 is converted into a spectrogram that represents the ground truth. To do so, the audio training data 107 may be transformed using any feature extraction model. The spectrogram is then used as an input to a ML model 505C in the audio forwarding regularizer 115. In one embodiment, like the ML model 505B in the visual encoder 110, the ML model 505C is a sequence-to-sequence ML model, which can be a LSTM, a bi-directional LSTM, a RNN), a 1D convnet, or other sequence learning methods. Advantageously, a sequence-to-sequence ML model provides improved results compared to other ML models when processing time dependent information such as the audio and visual training data.

The information bottleneck is performed by constraining the output of the ML model 505C. For example, reducing the output dimension of the ML model 505C can perform the information bottleneck. As shown, the ML model 505C generates a bottlenecked audio frame 510 using the spectrogram as an inputs. The audio forwarding regularizer 115 then replicates the frame 510 T times so, advantageously, there are as many copies of the bottlenecked audio frame 510 as the visual frames 515 which can improve the ability of the generator 125 to distinguish between the visual objects identified by the visual encoder 110 and the visually irrelevant sounds identified by the audio forwarding regularizer 115.

Reducing the dimension of the audio frame 510 to implement the information bottleneck inherently filters out some (or all) of the data corresponding to the visual relevant sounds. Stated differently, the dimensions of the audio frame 510 (i.e., the output of the ML model 505C) can be adjusted so that the frame 510 primarily contains data corresponding to the visually irrelevant sounds but not the visually relevant sounds, thereby implementing the information bottleneck as discussed above.

A combiner 520 combines the visual frames 505 generated by the visual encoder 110 with the replicated audio frames 510 generated by the audio forwarding regularizer 115 and forwards the resulting information to the generator 125. The generator 125 includes a ML model 505D that is downstream from the ML models in the encoder 110 and the regularizer 115 which attempts to replicate the sounds in the audio training data 107 by outputting a predicted spectrogram which should match the ground truth spectrogram. In one embodiment, the ML model 505D may include a mix of different layers such as transposed convolution layers, convolution layers, batch normalization (BN) layers, rectified linear unit (ReLU) layers, and the like. These layers can be combined into one ML model or into several daisy chained ML models. Further, although not shown, the generator 125 can include a post network coupled to the output of the ML model 505D that generates the predicted spectrogram.

As discussed above, during a training stage, the generator 125 receives data corresponding to the visual objects identified by the visual encoder 110 (i.e., the visual frames 515) and the data corresponding to the visually irrelevant sounds (i.e., the bottlenecked audio frames 510). From this information, the ML model 505D is trained to distinguish between the visual objects and the visually irrelevant sounds in the audio training data 107. Thus, during the execution stage, the likelihood the ML model 505D associates a visually irrelevant sound to a visual object in a silent video is advantageously reduced.

In one embodiment, training the ML system 500 to distinguish between visually relevant and irrelevant sounds can be formulated mathematically. In the discussion below, upper-cased letters denote random variables (unbolded) or random vectors (bolded); lower-cased letter denote deterministic values. E[ ] denotes expectation. H( ) denotes (discrete) Shannon entropy. Further, $(V(t);S(\tau))$ represents a visual-sound pair where $V(t)$ represents the visual signal (vectorized) at each video frame $t$ and $S(\tau)$ represents the sound representation (waveform or spectrogram) at each audio frame $\tau$. Different frame indexes, $t$ and $\tau$, are used because visual and sound signals have different sampling rates.

Assume the audio can be decomposed into a relevant signal and an irrelevant signal:

$$S(\tau)=S_r(\tau)+S_i(\tau) \quad (1)$$

The subscript r denotes relevant sounds while i denotes irrelevant sounds. Also assume there exists a relation, denoted as f( ), only between the video and relevant sound. The irrelevant sound is independent of both the relevant sound and the visual features. These relationships can be expressed as:

$$S_r(\tau)=f(V(t)), S_i(\tau) \perp S_r(\tau), S_i(\tau) \perp V(t) \quad (2)$$

where $\perp$ denotes independence. In one embodiment, the goal is to decouple the two components and only generate visually relevant component $S_r(\tau)$ from the visual signal $V(t)$.

The visual encoder 110 receives the video signal $V(t)$ as the input and outputs a set of video features. The audio forwarding regularizer 115 receives the sound signal $S(\tau)$ as the input and outputs audio forwarding information (i.e., the replicated bottlenecked audio frames 510). The generator 125 then predicts (or recovers) $S(\tau)$. There are two different types of predictions, with or without the audio forwarding. The prediction with audio forwarding, denoted as $\hat{S}_a(\tau)$, is predicted from both the video features and the audio forwarding information. The prediction without audio forwarding, denoted as $\hat{S}_0$, is predicted by setting the input to the audio forwarding regularizer to 0 using, e.g., the zero vector 310 illustrated in FIG. 3.

During training, the generator 125 tries to minimize the following loss that involves the prediction with audio forwarding:

$$L_{rec}+L_G=E[\Sigma_\tau \|\hat{S}_a(\tau)-S\|_2^2]+E[\log(1-D(\hat{S}_a,V))] \quad (3)$$

where the first term in Equation 3 is the reconstruction error, and the second term is the adversarial loss.

FIG. 6 is a ML system 600 for training ML models to synchronize sounds to visual data, according to one embodiment described herein. The ML system 600 is the same as the ML system 500 except for an additional communication link 605 between the visual encoder 110 and the audio forwarding regularizer 115. Specifically, the link 605 illustrates transmitting the output of the ML model 505A to the ML model 505C in the regularizer 115.

Omitting this link 605 as shown in the ML system 500 can advantageously improve operation efficiency in that the ML system 500 can execute faster, or use less resources relative to the ML system 600 which uses the link 605. However, the link 605 may improve the ability of the ML system 600 to distinguish between the visually relevant and irrelevant sounds relative to the ML system 500. For applications where there is generally one type of visual object, omitting the link 605 may lead to satisfactory results. For example, if the training data includes only a video of fireworks, then omitting the link 605 when training the ML system may be sufficient. That is, the ML system 500 is able to accurately distinguish between the visually relevant and irrelevant sounds without the link 605. However, if the training data includes multiple different visual objects, the link 605 may provide substantial improvements to performance by permitting the audio forwarding regularizer 115 to better distinguish between visually relevant and irrelevant sounds using the output of the ML model 505A as an input to the ML model 505C.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements discussed above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed above are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
   receiving visual training data at a visual encoder comprising a first machine learning (ML) model;
   identifying, using the first ML model executed using one or more processor, data corresponding to a visual object in the visual training data;
   receiving audio training data synchronized to the visual training data at an audio forwarding regularizer comprising a second ML model, wherein the audio training data comprises a visually relevant sound and a visually irrelevant sound that are both synchronized to a same frame in the visual training data that includes the visual object, wherein the visually relevant sound corresponds to the visual object but the visually irrelevant sound is generated by an audio source that is not visible in the same frame;

filtering out data corresponding to the visually relevant sound from an output of the second ML model using an information bottleneck such that only data corresponding to the visually irrelevant sound is primarily output from the information bottleneck; and training a third ML model downstream from the first and second ML models using the data corresponding to the visual object and data corresponding to the visually irrelevant sound received from the information bottleneck.

2. The method of claim 1, further comprising, after training the third ML model:

performing an execution stage, the execution stage comprising:

receiving a silent video at the first ML model;

identifying, using the first ML model, data corresponding to a second visual object in the silent video;

generating, using the third ML model, a visually relevant sound to synchronize to at least one video frame of the silent video containing the second visual object, wherein data corresponding to the second visual object is inputted to the third ML model; and generating a media presentation based on the synchronized visually relevant sound and video frames in the silent video.

3. The method of claim 2, wherein the second ML model in the audio forwarding regularizer is unused during the execution stage.

4. The method of claim 1, wherein the information bottleneck comprises limiting a dimension of an output of the second ML model, wherein limiting the dimension prevents data corresponding to the visually relevant sound from reaching the third ML model.

5. The method of claim 1, wherein the second ML model comprises a sequence-to-sequence ML model.

6. The method of claim 5, wherein the sequence-to-sequence ML model outputs a bottlenecked audio frame based on the audio training data and the information bottleneck, the method further comprising:

replicating the bottlenecked audio frame according to a number of T time periods in the visual training data; and transmitting the replicated bottlenecked audio frames to the third ML model.

7. The method of claim 6, further comprising:

predicting, using the third ML model, the visually relevant and irrelevant sounds in the audio training data based on receiving the replicated bottlenecked audio frames and the data corresponding to a visual object.

8. A computer program product, comprising:

a computer-readable storage medium having computer-readable program code embodied therewith, the computer-readable program code executable by one or more computer processors to perform an operation, the operation comprising:

receiving visual training data at a visual encoder comprising a first ML model;

identifying, using the first ML model, data corresponding to a visual object in the visual training data;

receiving audio training data synchronized to the visual training data at an audio forwarding regularizer comprising a second ML model, wherein the audio training data comprises a visually relevant sound and a visually irrelevant sound that are both synchronized to a same frame in the visual training data that includes the visual object, wherein the visually relevant sound corresponds to the visual object but the visually irrelevant sound is generated by an audio source that is not visible in the same frame;

filtering out data corresponding to the visually relevant sound from an output of the second ML model using an information bottleneck such that only data corresponding to the visually irrelevant sound is primarily output from the information bottleneck; and training a third ML model downstream from the first and second ML models using the data corresponding to the visual object and data corresponding to the visually irrelevant sound received from the information bottleneck.

9. The computer program product of claim 8, wherein the operation further comprises, after training the third ML model:

performing an execution stage, the execution stage comprising:

receiving a silent video at the first ML model;

identifying, using the first ML model, data corresponding to a second visual object in the silent video;

generating, using the third ML model, a visually relevant sound to synchronize to at least one video frame of the silent video containing the second visual object, wherein data corresponding to the second visual object is inputted to the third ML model; and generating a media presentation based on the synchronized visually relevant sound and video frames in the silent video.

10. The computer program product of claim 9, wherein the second ML model in the audio forwarding regularizer is unused during the execution stage.

11. The computer program product of claim 8, wherein the information bottleneck comprises limiting a dimension of an output of the second ML model, wherein limiting the dimension prevents data corresponding to the visually relevant sound from reaching the third ML model.

12. The computer program product of claim 8, wherein the second ML model comprises a sequence-to-sequence ML model.

13. The computer program product of claim 12, wherein the sequence-to-sequence ML model outputs a bottlenecked audio frame based on the audio training data and the information bottleneck, the operation further comprising:

replicating the bottlenecked audio frame according to a number of T time periods in the visual training data; and transmitting the replicated bottlenecked audio frames to the third ML model.

14. The computer program product of claim 13, wherein the operation further comprises:

predicting, using the third ML model, the visually relevant and irrelevant sounds in the audio training data based on receiving the replicated bottlenecked audio frames and the data corresponding to a visual object.

15. A system, comprising:

a processor; and a memory comprising a program, which when executed by the processor, performs an operation, the operation comprising:

receiving visual training data at a visual encoder comprising a first ML model;

identifying, using the first ML model, data corresponding to a visual object in the visual training data;

receiving audio training data synchronized to the visual training data at an audio forwarding regularizer comprising a second ML model, wherein the audio training data comprises a visually relevant sound and a visually irrelevant sound that are both synchronized to a same frame in the visual training data that includes the visual object, wherein the visually relevant sound corresponds to the visual object but the visually irrelevant sound is generated by an audio source that is not visible in the same frame;

filtering out data corresponding to the visually relevant sound from an output of the second ML model using an information bottleneck such that only data corresponding to the visually irrelevant sound is primarily output from the information bottleneck; and training a third ML model downstream from the first and second ML models using the data corresponding to the visual object and data corresponding to the visually irrelevant sound received from the information bottleneck.

16. The system of claim 15, wherein the operation further comprises, after training the third ML model:

performing an execution stage, the execution stage comprising:

receiving a silent video at the first ML model;

identifying, using the first ML model, data corresponding to a second visual object in the silent video;

generating, using the third ML model, a visually relevant sound to synchronize to at least one video frame of the silent video containing the second visual object, wherein data corresponding to the second visual object is inputted to the third ML model; and generating a media presentation based on the synchronized visually relevant sound and video frames in the silent video.

17. The system of claim 16, wherein the second ML model in the audio forwarding regularizer is unused during the execution stage.

18. The system of claim 15, wherein the information bottleneck comprises limiting a dimension of an output of the second ML model, wherein limiting the dimension prevents data corresponding to the visually relevant sound from reaching the third ML model.

19. The system of claim 15, wherein the second ML model comprises a sequence-to-sequence ML model and wherein the sequence-to-sequence ML model outputs a bottlenecked audio frame based on the audio training data and the information bottleneck, the operation further comprising:

replicating the bottlenecked audio frame according to a number of T time periods in the visual training data; and transmitting the replicated bottlenecked audio frames to the third ML model.

20. The system of claim 19, wherein the operation further comprises:

predicting, using the third ML model, the visually relevant and irrelevant sounds in the audio training data based on receiving the replicated bottlenecked audio frames and the data corresponding to a visual object.

\* \* \* \* \*